(12) United States Patent
Tatsuta et al.

(10) Patent No.: US 10,585,216 B2
(45) Date of Patent: Mar. 10, 2020

(54) LIGHT-GUIDING PRISM AND HEAD-MOUNTED VIDEO DISPLAY APPARATUS USING THE SAME

(71) Applicant: OLYMPUS CORPORATION, Tokyo (JP)

(72) Inventors: Seiji Tatsuta, Hachioji (JP); Yoichi Iba, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 202 days.

(21) Appl. No.: 15/814,472

(22) Filed: Nov. 16, 2017

(65) Prior Publication Data

US 2018/0074235 A1 Mar. 15, 2018

Related U.S. Application Data

(63) Continuation of application No. PCT/JP2015/064161, filed on May 18, 2015.

(51) Int. Cl.
*G02B 5/04* (2006.01)
*G02B 27/01* (2006.01)
*F21V 8/00* (2006.01)

(52) U.S. Cl.
CPC ........... *G02B 5/04* (2013.01); *G02B 27/0172* (2013.01); *G02B 6/0028* (2013.01); *G02B 2027/0178* (2013.01)

(58) Field of Classification Search
CPC .... G02B 5/04; G02B 27/0172; G02B 6/0028; G02B 2027/0178; G02B 27/0081
See application file for complete search history.

(56) References Cited

U.S. PATENT DOCUMENTS 8,305,296 B2  11/2012  Iba et al.
2007/0058261 A1*  3/2007  Sugihara ............... G02B 6/0011
                                              359/630

(Continued)

FOREIGN PATENT DOCUMENTS

JP  2010-224473 A  10/2010
JP  2010-232718 A  10/2010

(Continued)

OTHER PUBLICATIONS

International Search Report and Written Opinion dated Aug. 4, 2015 issued in PCT/JP2015/064161.

(Continued)

*Primary Examiner* — Kimberly N. Kakalec
(74) *Attorney, Agent, or Firm* — Scully, Scott, Murphy & Presser, P.C.

(57) ABSTRACT

A light-guiding prism includes a first optical surface which is a surface of incidence on which image light from a display element is incident, and a second optical surface, a third optical surface, a fourth optical surface, and a fifth optical surface which are at least four optical surfaces disposed to surround an optical path of the image light that is incidence from the first optical surface. A sixth optical surface reflects the image light that is guided in a prism surrounded by that at least four side surfaces, which are the second optical surface, the third optical surface, the fourth optical surface, and the fifth optical surface. The fourth optical surface and the fifth optical surface are inclined at a surface perpendicular to a surface include an incident-light axis of the image light, made by the incident-light axis and a reflected-light axis of the sixth optical surface. Moreover, the fourth optical surface and the fifth optical surface are inclined at a surface perpendicular to the incident-light axis. Furthermore, the (Continued)

sixth optical surface which is a reflecting surface has a rectangular shape.

5 Claims, 4 Drawing Sheets

(56) References Cited

U.S. PATENT DOCUMENTS

| 2010/0245211 | A1 | 9/2010 | Iba et al. |
| 2012/0242561 | A1 | 9/2012 | Sugihara |
| 2017/0176754 | A1* | 6/2017 | Tomine .............. G02B 27/0018 |

FOREIGN PATENT DOCUMENTS

| JP | 2012-203113 A | 10/2012 |
| JP | 2013-080039 A | 5/2013 |

OTHER PUBLICATIONS

International Preliminary Report on Patentability together with the Written Opinion from related International Application No. PCT/JP2015/064161 dated Nov. 30, 2017.

* cited by examiner

LIGHT-GUIDING PRISM AND HEAD-MOUNTED VIDEO DISPLAY APPARATUS USING THE SAME

CROSS-REFERENCE TO RELATED APPLICATION

The present application is a continuation of PCT/JP2015/064161, filed on May 18, 2015; the entire contents of which are incorporated herein by reference.

BACKGROUND OF THE INVENTION

Field of the Invention

The present invention relates to a light-guiding prism, and a head-mounted video display apparatus using the same.

Description of the Related Art

In recent years, an apparatus called as a head-mounted video display apparatus (or head-mounted display) has been gathering attention. In such head-mounted video display apparatus, a method in which video light or image light emerged from a small-size display element (such as a liquid-crystal display panel and an organic EL (electro-luminescence)) is guided to a pupil of a user by using an optical element such as a mirror or a prism is adopted.

An optical system which guides the image light from the display element to the pupil by making the light reflect at an inside of the prism for a plurality of times by using a light-guiding prism at this time, has been known (refer to Japanese Patent Application Laid-open Publication No. 2010-224473 for example).

SUMMARY OF THE INVENTION

An object of the present invention is to provide a light-guiding prism which is capable of suppressing a ghost that is guided to a pupil of a user, as well as guiding image light having a rectangular shape to the pupil of the user, and a head-mounted video display apparatus having the same.

A light-guiding prism according to the present invention includes a surface of incidence on which image light from a display element is incident, at least four side surfaces which are disposed to surround an optical path of the image light that is incident from the surface of incidence, a reflecting surface which reflects the image light that is incident from the surface of incidence, and that is guided along the optical path, a surface of emergence from which the image light reflected at the reflecting surface emerges toward a pupil of a user, wherein the at least four side surfaces have two sets of two side surfaces which are mutually facing, and one of the two sets of two side surfaces which are mutually facing, are inclined at a surface which includes an incident-light axis of the image light and is perpendicular to a surface including the incident-light axis and including a reflected-light axis of the reflecting surface, and are inclined at a surface perpendicular to the incident-light axis, and the reflecting surface has a rectangular shape.

Moreover, a head-mounted video display apparatus according to the present invention includes a display element which displays an image, and a light-guiding prism which guides image light from the display element in a direction of a pupil of a user, wherein the light-guiding prism is the abovementioned light-guiding prism.

DETAILED DESCRIPTION OF THE INVENTION

Embodiments of a light-guiding prism according to the present invention, and a head-mounted video display apparatus using the same will be described below in detail by referring to the accompanying diagrams. However, the present invention is not restricted to the embodiments described below.

First Embodiment

Figure 1A:
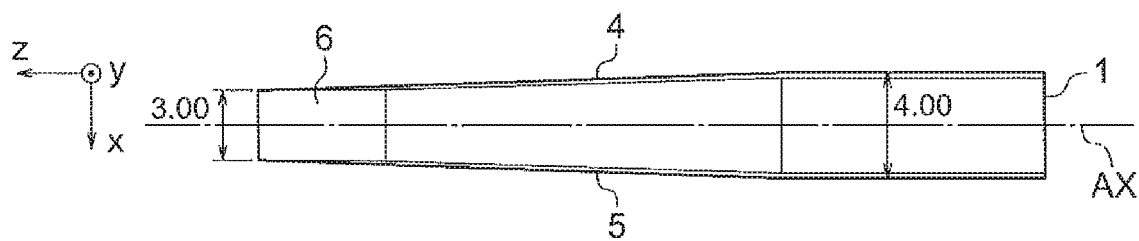
FIG. 1A is a front view of a light-guiding prism according to an embodiment of the present invention, viewed from a side opposite to a side of a user.
Figure 1B:
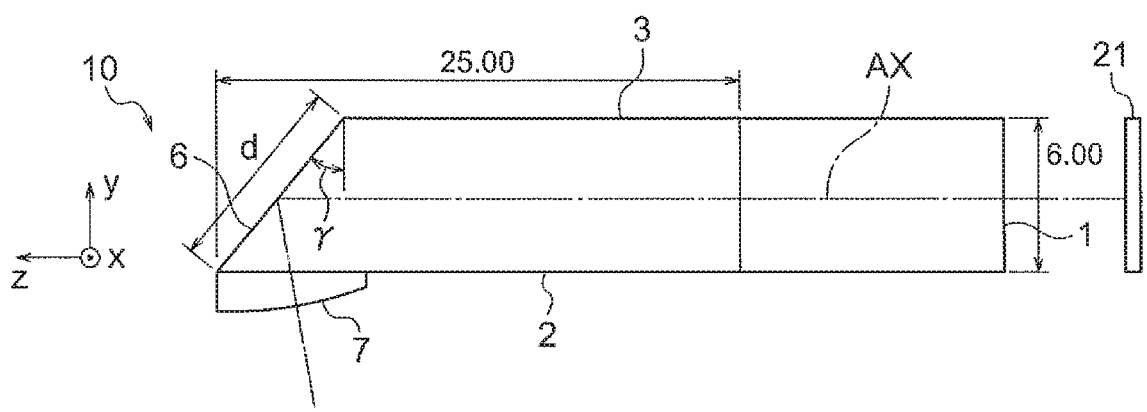
FIG. 1B is a plan view of the light-guiding prism according to the embodiment of the present invention.
Figure 1C:
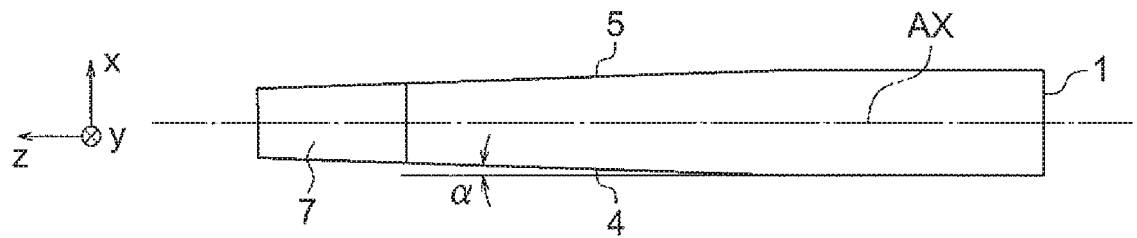
FIG. 1C is a front view of the light-guiding prism according to the embodiment of the present invention, viewed from the user.
Figure 1D:
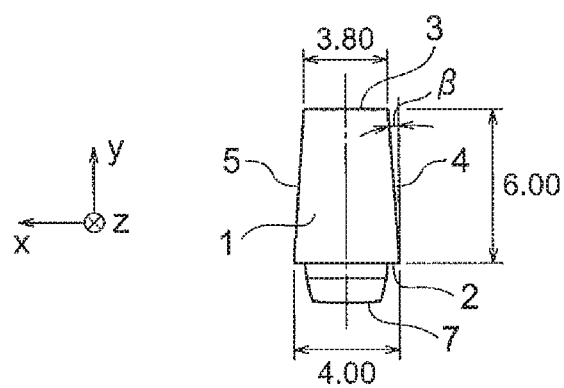
FIG. 1D is a side view of the light-guiding prism according to the embodiment of the present invention, viewed from a side on which image light is incident.
Figure 1E:
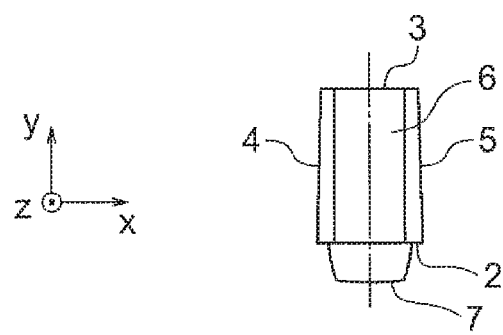
FIG. 1E is a side view of the light-guiding prism according to the embodiment of the present invention, viewed from a side of the reflecting surface.

FIG. 1A is a front view of a light-guiding prism 10 according to an embodiment of the present invention, viewed from a side opposite to a side of a user (not shown in the diagram). FIG. 1B is a plan view of the light-guiding prism 10. FIG. 1C is a front view of the light-guiding prism 10 viewed from the user. FIG. 1D is a side view of the light-guiding prism 10 viewed from a side on which image light is incidence. FIG. 1E is a side view of the light-guiding prism 10 viewed from a side of the reflecting surface.

The light-guiding prism 10 of the present embodiment has an arrangement in which an eyepiece 7 is cemented to a hexahedral prism. The hexahedral prism includes a first optical surface 1, a second optical surface 2, a third optical surface 3, a fourth optical surface 4, a fifth optical surface 5, and a sixth optical surface 6. Moreover, the eyepiece 7 is cemented to a portion from which image light emerges.

The first optical surface 1 is a surface of incidence on which image light from a display element 21 is incident. The second optical surface 2 and the third optical surface 3 are surfaces in a hexahedron which are mutually facing, and are arranged to be substantially parallel mutually. Moreover, the fourth optical surface 4 and the fifth optical surface 5 are surfaces in the hexahedron which are mutually facing. The sixth optical surface 6 reflects the image light that has been guided. The image light reflected at the sixth optical surface 6 emerges toward a pupil of a user not shown in the diagram, by the eyepiece 7.

Figure 2:
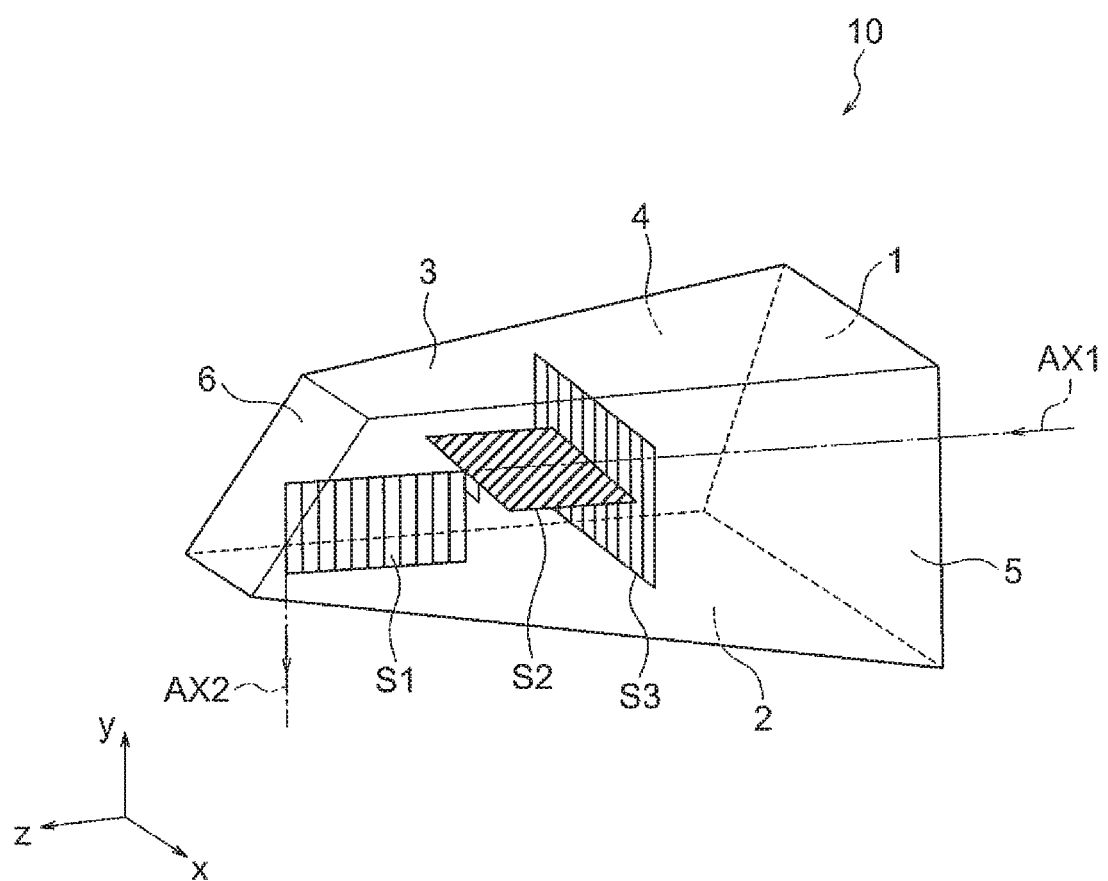
FIG. 2 is a perspective arrangement view of the light-guiding prism according to the embodiment of the present invention.

The description will be continued further by referring to FIG. 2. FIG. 2 shows a perspective view of an arrangement of the light-guiding prism 10 of the present embodiment. In FIG. 2, the eyepiece 7 is omitted.

As mentioned above, the light-guiding prism 10 has the first optical surface 1 which is the surface of incidence on which the image light from the display element 21 is incident, and at least four side surfaces disposed to surround an optical path of image light that is incident from the first optical surface 1, which are, the second optical surface 2, the third optical surface 3, the fourth optical surface 4, and the fifth optical surface 5. The sixth optical surface 6, which is the reflecting surface, reflects image light that has been guided in the prism surrounded by the at least four side surfaces, or in other words, surrounded by the second optical surface 2, the third optical surface 3, the fourth optical surface 4, and the fifth optical surface 5. The image light reflected at the sixth optical surface 6 (reflecting surfaces) emerges from the eyepiece 7 which is the surface of emergence, toward an eyeball of the user not shown in the diagram.

The at least four side surfaces include two sets of two side surfaces which are mutually facing. The side surfaces which are mutually facing in one of the sets of two side surfaces are the second optical surface 2 and the third optical surface 3. The side surfaces which are mutually facing in the other set of the side surfaces are the fourth optical surface 4 and the fifth optical surface 5.

Moreover, the fourth optical surface 4 and the fifth optical surface 5, which form one of the two sets of the two side surfaces which are mutually facing, include an incident-light axis AX1 of the image light, and are inclined to be tapering off from the first optical surface 1 to the sixth optical surface 6 in a surface S2 perpendicular to the a surface S1 including an incident-light axis of the image light, made by the incident-light axis AX1 and a reflected-light axis AX2 of the sixth optical surface 6 (reflecting surface). Moreover, the fourth optical surface 4 and the fifth optical surface 5 are inclined to be tapering off from the second optical surface 2 toward the third optical surface 3 in a surface S3 perpendicular to the incident-light axis AX1. Furthermore, the sixth optical surface 6 which is a reflecting surface has a rectangular shape.

The fourth optical surface 4 and the fifth optical surface 5, which form one of the two sets of the two side surfaces which are mutually facing, has a first tapered structure in which a distance between the two side surfaces which are mutually facing is narrowed from a side of the first optical surface 1 (surface of incidence) toward a side of the sixth optical surface 6 (reflecting surface). In other words, the fourth optical surface 4 and the fifth optical surface 5 have a tapered structure in which a distance between the two side surfaces which are mutually facing becomes shorter gradually from the surface of incidence toward the reflecting surface side.

Moreover, the fourth optical surface 4 and the fifth optical surface 5 which are mutually facing, have a second tapered structure in which a distance between the two side surfaces which are mutually facing is narrowed from a side of the second optical surface 2 toward a side of the third optical surface 3. In other words, the fourth optical surface 4 and the fifth optical surface 5 have a tapered structure in which a distance becomes shorter gradually from the side of the second optical surface 2 toward the side of the third optical surface 3.

More specifically, as shown in FIG. 1A and FIG. 1C, a surface interval between the fourth optical surface 4 and the fifth optical surface 5 becomes smaller gradually toward a side of emergence of a the image light, and arranged to have a so-called shape of a trapezoid.

Moreover, a shape of the first optical surface 1, as shown in FIG. 1D, is narrowed gradually toward a positive direction of a y-axis, and is arranged to have a so-called shape of the trapezoid.

Here, it is desirable that an angle of inclination $\alpha$ of the first tapered structure (FIG. 1C) is smaller than an angle of inclination $\beta$ of the second tapered structure (FIG. 1D). By satisfying this condition, it is easy to satisfy a condition for total reflection.

In a case in which the shape of the light-guiding prism 10 is a shape of a quadrangular rod prism, it gives rise to a ghost which is caused due to a reflection at a side surface which is unintended, around a regular image which the user observes. By having the first tapered structure and the second tapered structure in two directions as in the present embodiment, it is possible to keep the ghost away from the regular image.

Furthermore, for reducing the ghost efficiently, it is possible to carry out an emboss processing and to form a groove in a front surface of the side surface near the first optical surface 1 which is the surface of incidence of the light-guiding prism 10.

A surface to be provided with a taper is not restricted to the surface described above, and a surface may be inclined such that a distance (surface interval) between the second optical surface 2 and the third optical surface 3 becomes gradually smaller toward the reflecting surface.

Furthermore, when the angle of inclination of the first tapered structure is let to be $\alpha$ (FIG. 1C), the angle of inclination of the second tapered structure is let to be $\beta$, and an angle made by the incident-light axis of the image light incident on the reflecting surface and a normal of the reflecting surface is let to be $\gamma$, it is desirable to satisfy the following conditional expression (1).

$$\tan \gamma = \tan \beta / \tan \alpha \quad (1)$$

By satisfying conditional expression (1), it is possible to let the shape of the sixth optical surface 6 which is the reflecting surface, to be a rectangular shape. An image display area of the display element 21 has a rectangular shape. Therefore, by letting the shape of the sixth optical surface 6 to be the rectangular shape, the observer can observe an effective light beam of a rectangular shape while making a size of the light-guiding prism 10 as small as possible.

Moreover, according to a preferable aspect of the present invention, when a length in a longitudinal direction of the sixth optical surface 6 which is the reflecting surface is let to be d, it is desirable to satisfy the following conditional expression (2).

$$d \times \sin \gamma \times \tan \alpha = d \times \cos \gamma \times \tan \beta \quad (2)$$

Even by satisfying conditional expression (2), it is possible to let the sixth optical surface 6 (reflecting surface) to be rectangular-shaped.

Next, specific numerical examples of the light-guiding prism according to the present embodiment will be indicated. Here, the description will be made by citing an example in which the first tapered surface is formed on the fourth optical surface 4 and a part of the fifth optical surface 5. In a case in which, as shown in FIG. 1A, on the side of the second optical surface 2, the distance between the fourth optical surface 4 and the fifth optical surface 5 near the first optical surface 1 is let to be 4.00 mm, and a distance between the fourth optical surface 4 and the fifth optical surface 5 near the sixth optical surface 6 is let to be 3.00 mm, and as shown in FIG. 1B, a length of the fourth optical surface 4 and a portion of the first tapered structure of the fifth optical surface 5 is let to be 25.00 mm, the angle of inclination α of the first tapered structure becomes 0.02 degrees.

Furthermore, in a case in which, as shown in FIG. 1D, a length of the first optical surface 1 in a y-direction is let to be 6.00 mm, and on the side of the third optical surface 3, a distance between the fourth optical surface 4 and the fifth optical surface 5 near the first optical surface 1 is let to be 3.80 mm, the angle of inclination β of the second tapered structure becomes 0.0167 degrees.

At this time, the angle γ made by the incident-light axis AX1 for the image light incident on the sixth optical surface 6 (reflecting surface) and the normal of a reflecting portion is 40.0 degrees.

It is preferable that the angle of inclination β of the second tapered structure is in a range of 0.01 degrees to 1.5 degrees. By letting the angle of inclination β to be in this range, it is possible to let the shape of the sixth optical surface 6 (reflecting surface) to be almost a rectangular shape.

Second Embodiment

Next, a head-mounted video display apparatus which includes the light-guiding optical prism 10 of the first embodiment will be described below.

Figure 3:
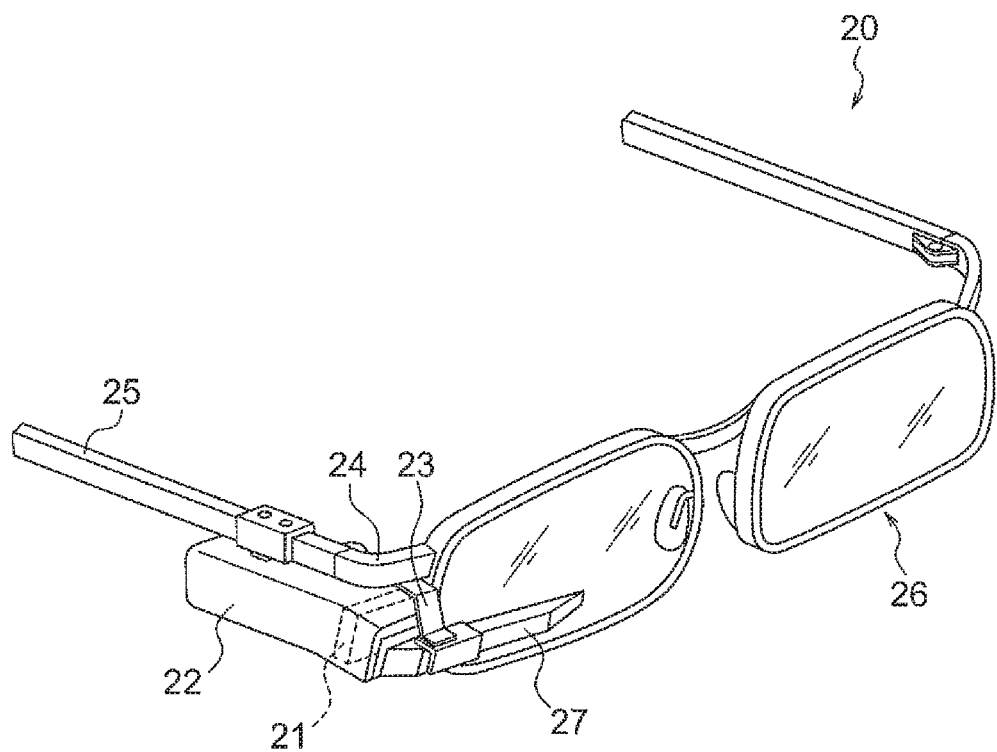
FIG. 3 is a diagram illustrating a head-mounted video display apparatus according to an embodiment of the present invention.

FIG. 3 shows a schematic arrangement of a head-mounted video display apparatus 20. The head-mounted video display apparatus 20 includes a main-body unit 22 and an optical unit 27, and is to be used with eyeglasses 26 that are commonly used.

The main-body unit 22 includes the display element 21 such as a liquid-crystal panel and an organic EL, and moreover a display-element drive device etc., which is fixed to a temple 25 of the eyeglasses 26.

The optical unit 27 includes the abovementioned light-guiding prism 10 at an interior thereof, and is independent of the main-body unit 22. Here, the optical unit 27 in which the light-guiding prism 10 of the abovementioned first embodiment is housed in an outer case and an optical member molded integrally, can be used. The optical unit 27 is fixed to a wraparound end piece 24 via a holding member 23.

In the head-mounted video display apparatus 20 according to the present embodiment, by guiding light in the interior of the light-guiding prism 10, it is possible to dispose the display element 21 at a portion where it does not hinder the eyesight.

According to the head-mounted video display apparatus 20 of the present embodiment, it is possible to suppress the ghost which is guided to the pupil of the user, as well as to direct the image light having a rectangular shape to the pupil of the user.

In an arrangement shown in FIG. 3, since the main-body unit 22 and the optical unit 27 are separated, the arrangement is such that when the temple 25 of the eyeglasses 26 are folded, the main-body unit 22 can also be folded in conjunction.

As described above, the present invention is useful for a light-guiding prism which is capable of suppressing the ghost that is guided to the pupil of the user, as well as to direct the image light having a rectangular shape to the pupil of the user, and a head-mounted video display apparatus using the same.

The present invention shows an effect that it is possible to provide a light-guiding prism which is capable of suppressing the ghost that is guided to the pupil of the user, as well as to direct the image light having a rectangular shape to the pupil of the user, and a head-mounted video display apparatus using the same.

What is claimed is:

1. A light-guiding prism comprising:
   a surface of incidence on which image light from a display element is incident;
   at least four side surfaces which are disposed to surround an optical path of the image light that is incident from the surface of incidence;
   a reflecting surface which reflects the image light that is incident from the surface of incident, and that is guided along the optical path, the reflecting surface having a rectangular shape; and
   a surface of emergence from which the image light reflected at the reflecting surface emerges toward a pupil of a user, wherein
   the at least four side surfaces include two sets of two side surfaces which are mutually facing, the at least four side surfaces comprise:
   a first tapered structure in which a distance between the two side surfaces which are mutually facing in one of the sets of two surfaces facing mutually of the two sets becomes shorter gradually from an incident-surface side to a reflecting-surface side,
   a second tapered structure in which, a distance between the two side surfaces which are mutually facing, becomes shorter gradually in a direction away from an emergence-surface side.

2. The light-guiding prism according to claim 1, wherein an angle of inclination of the first tapered structure is smaller than an angle of inclination of the second tapered structure.

3. The light-guiding prism according to claim 1, wherein when an angle of inclination of the first tapered structure is α, an angle of inclination of the second tapered structure is β, and an angle made by an incident-light axis of the image light incident on the reflecting surface and a normal of the reflecting surface is γ, the light-guiding prism satisfies the following conditional expression (1)

$$\tan \gamma = \tan \beta / \tan \alpha \qquad (1).$$

4. The light-guiding prism according to claim 3, wherein when a length in a longitudinal direction of the reflecting surface is d, the light-guiding prism satisfies the following conditional expression (2)

$$d \times \sin \gamma \times \tan \alpha = d \times \cos \gamma \times \tan \beta \qquad (2).$$

5. A head-mounted video display apparatus, comprising:
   a display element which displays an image; and
   the light-guiding prism according to claim 1 for guiding image light from the display element in a direction of a pupil of a user.

\* \* \* \* \*